Figure 6:
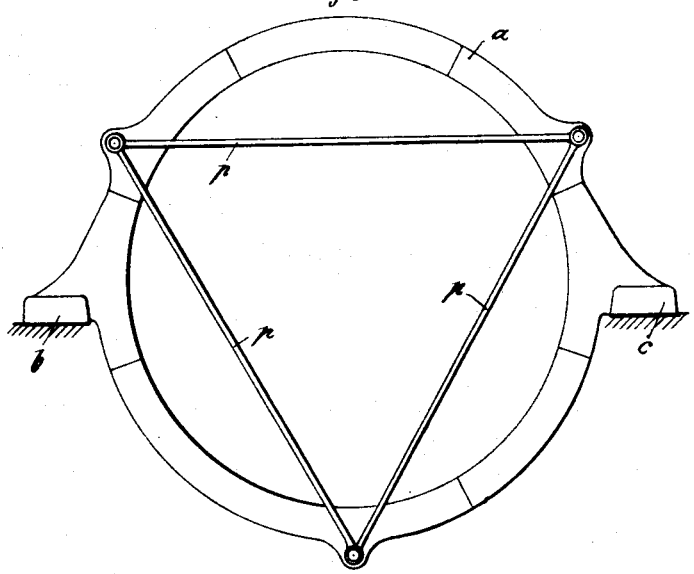

No. 681,800. Patented Sept. 3, 1901.
O. LASCHE.
STATIONARY ARMATURE AND INDUCTOR.
(Application filed June 18, 1901.)
(No Model.) 8 Sheets—Sheet 1.
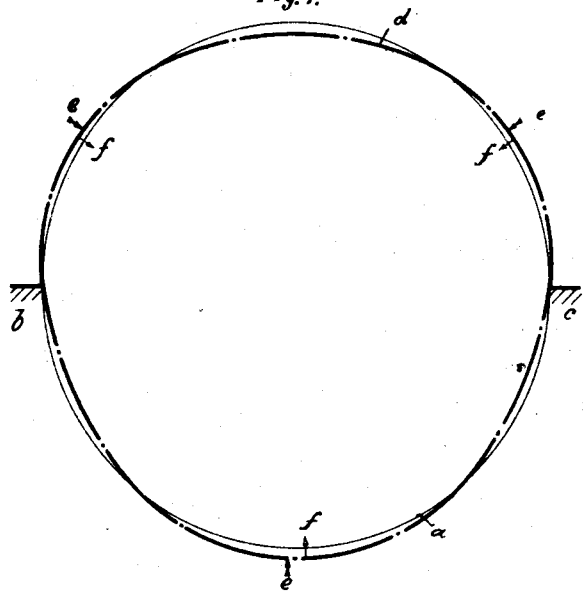
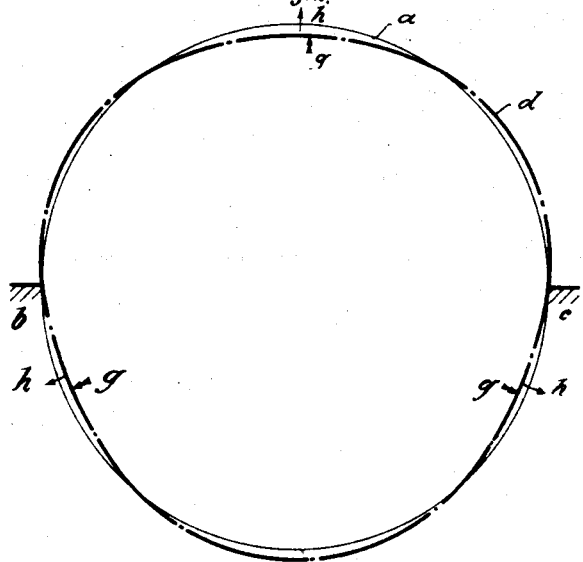

No. 681,800. Patented Sept. 3, 1901.
O. LASCHE.
STATIONARY ARMATURE AND INDUCTOR.
(Application filed June 18, 1901.)
(No Model.) 8 Sheets—Sheet 2.
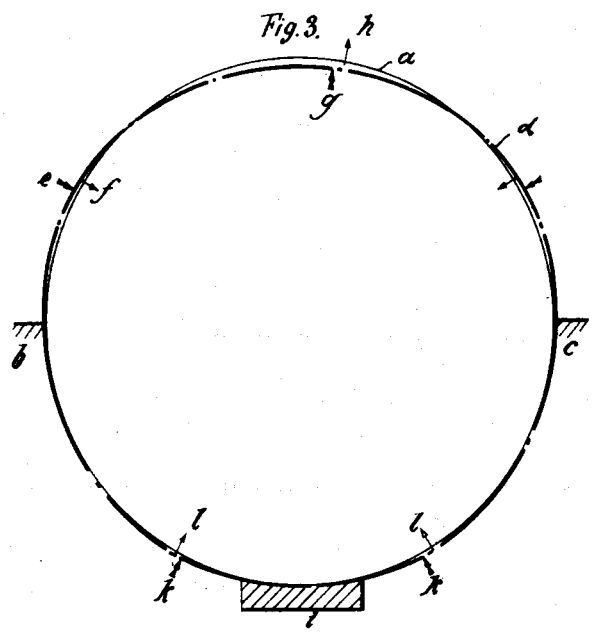
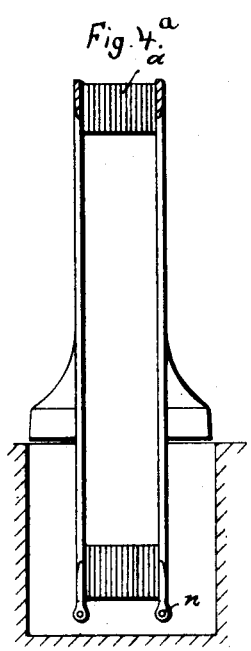
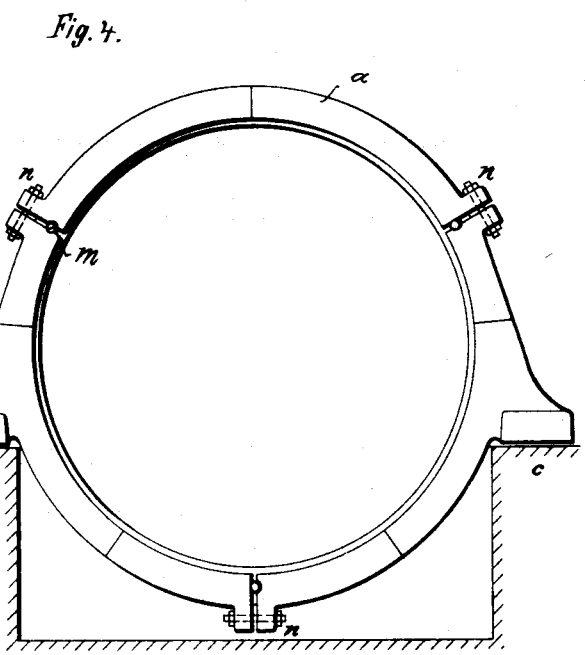
Witnesses
R. Aberli
John Lotka
Inventor
Oskar Lasche
By Briesen & Knauth
his Attorneys

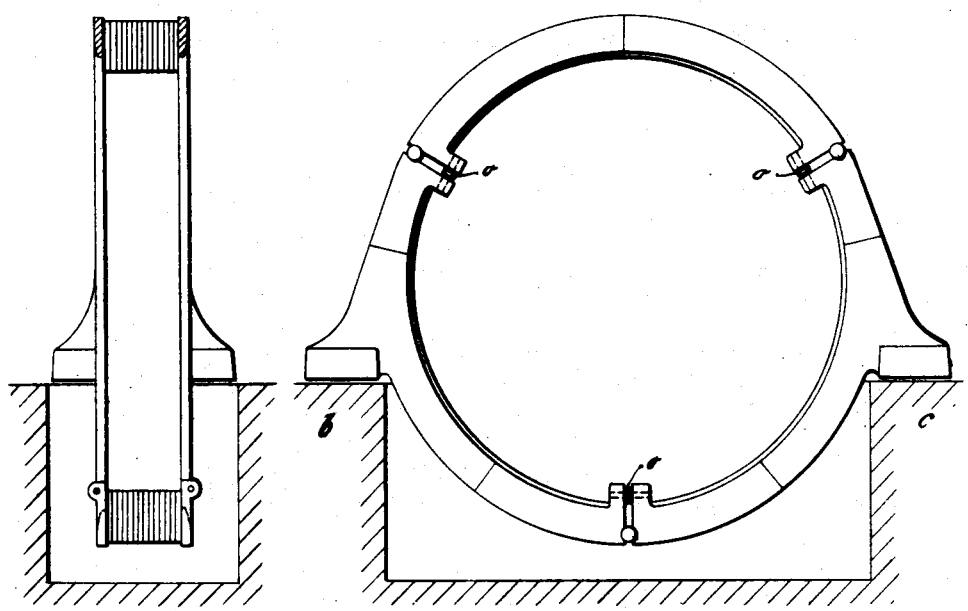

No. 681,800. Patented Sept. 3, 1901.
O. LASCHE.
STATIONARY ARMATURE AND INDUCTOR.
(Application filed June 18, 1901.)
(No Model.) 8 Sheets—Sheet 5.

Witnesses
R. Aberli
John Lotka

Inventor
Oskar Lasche
By Briesen & Knauth
his Attorneys

No. 681,800. Patented Sept. 3, 1901.
O. LASCHE.
STATIONARY ARMATURE AND INDUCTOR.
(Application filed June 18, 1901.)
(No Model.) 8 Sheets—Sheet 6.

No. 681,800. Patented Sept. 3, 1901.
O. LASCHE.
STATIONARY ARMATURE AND INDUCTOR.
(Application filed June 18, 1901.)

(No Model.) 8 Sheets—Sheet 8.

UNITED STATES PATENT OFFICE.

OSKAR LASCHE, OF BERLIN, GERMANY.

STATIONARY ARMATURE AND INDUCTOR.

SPECIFICATION forming part of Letters Patent No. 681,800, dated September 3, 1901.

Application filed June 18, 1901. Serial No. 65,043. (No model.)

*To all whom it may concern:*

Be it known that I, OSKAR LASCHE, engineer, a subject of the German Emperor, residing at Berlin, Kingdom of Prussia, German Empire, have invented certain new and useful Improvements in Stationary Armatures and Inductors, of which the following is a specification.

In Letters Patent No. 672,232, granted to me April 16, 1901, armatures and inductors made of sheet-metal laminæ are described, in connection with which the heavy cast-iron casing is dispensed with, the metal ring being put under tension direct or by means of constructional connections. Simple theoretical considerations show that it is not necessary for the sheet-metal ring to be wholly and solely under its own tension, but that it is sufficient if it be forced out at the deepest places where it is most deeply bent in, if it be pressed in at the places where it is most bent out, this being effected by causing bracing or pressure devices to bear on the ring itself or the segments thereof at the places where it is most deformed by being bent outward or inward.

In the accompanying drawings, Figures 1 to 3 and Figs. 8 and 9 are diagrammatic views of the invention, Figs. 4 to 7 and Figs. 10 to 16 representing some of the forms in which the invention may be carried out. Figs. 4ª and 5ª are central sectional elevations of the constructions shown in Figs. 4 and 5, respectively.

Assuming that the metal laminæ ring $a$, Fig. 1, has two points of support $b\ c$, the line of deflection or deformation $d$ will then assume an approximately heart-shaped form. If now at the places where the outward deformation is greatest (in the present case three in number) inwardly-acting forces $e$ be caused to bear from without or tension forces $f$ from within, they will obviate the alterations in shape arising from the weight of the ring itself. As shown in Fig. 2, the curvature of the ring can be restored by causing pressing forces $g$ to act from within at those points where the ring is bent inward to the greatest extent or tension forces to act from without. The same course is taken with rings having three or more points of support. As shown in Fig. 3, the line of deflection $d$ of a ring with three points of support $b\ c\ i$ resembles that of rings with two points of support. The deformations in the upper part of the ring $a$ are prevented, as in Figs. 1 and 2, by means of tension or pressing forces either at the points $e\ f$, where the ring is most deformed outward, or at those $g\ h$, where it is most bent inward.

Figure 7:
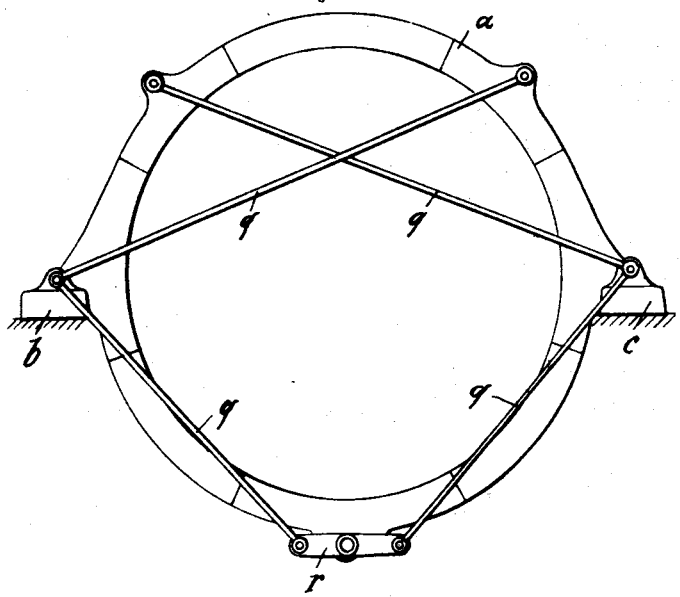

Figs. 4 to 7 illustrate some practical examples of the invention. The sheet-metal ring $a$, supported at two points, (shown in Figs. 4 and 5,) is prevented from being put out of shape by dividing the segments at the points where the ring is most bent out and making them movable or adjustable in relation to one another by means of inserted bolts $m$, rollers, balls, wedges, or the like. Drawbolts $n$ on the outside, Fig. 4, or thrust-bolts $o$ on the inside, Fig. 5, connect the cheek portions. These bolts may also engage with flanges arranged on the metal rim itself or the flexible ring itself may be employed as a link. By screwing up these bolts the cheek-segments and the sheet-metal rim are flattened and the bent-out rim is bent inward. Instead of using divided segments I may employ a ring constructed of abutting segments. In this case the points where the ring is most bent out are connected by tensioning-rods $p$. (See Fig. 6.) It is not necessary that the tensioning-rods should form a connected system inside the metal ring. The rods $q$, as shown in Fig. 7, may bear either directly or by means of a supporting-plate $r$ on the points where the greatest outward deformation is found and might have their supporting-point outside the ring somewhere in the bed-piece.

The examples previously described relate to metal rings with only two points of support, in which changes of shape in the ring are prevented by causing tension or pressing forces to act on the points where the outward bend is greatest. As a matter of course arrangements of this kind may also be applied to metal rings with a great number of supporting-points, and the same arrangement may likewise be employed at the points where the ring is most deformed inwardly for obviating changes in its shape. It is even possible to act on the ring at the points where it is most bent outward and inward together or only at some of these points for the purpose of restoring its proper curvature. The present invention is not restricted to entire rings, but is also applicable to half-rings or even smaller parts of rings.

Figure 8:
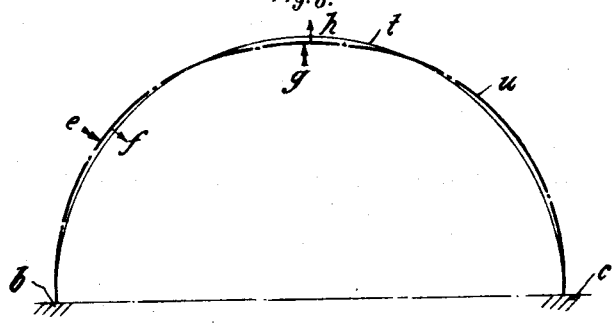
Figure 9:
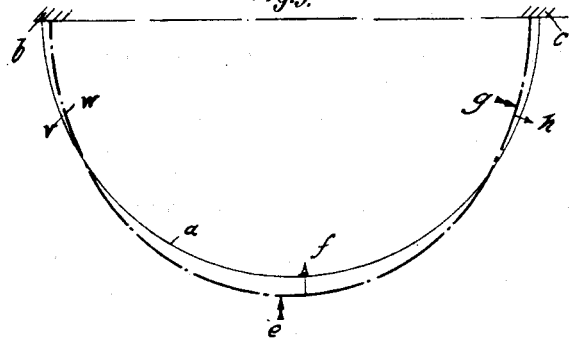
Figure 10:
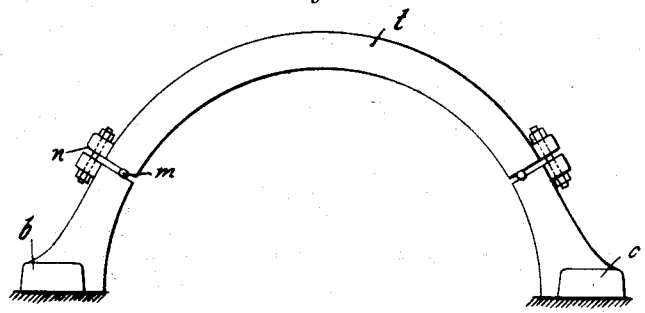

Figs. 8 and 9 are diagrammatic views which show that deflections $u$ of fixed half-rings $t$ or of suspended half-rings $v$ with two points of support $b\ c$ are also obviated (see the line of deflection $u$ or $w$) by causing pressing or tension organs $e\ f\ g\ h$ to bear on the points where the greatest inward or outward deformation occurs. The same course is pursued with half-rings or segments having more than two points of support. The practical form of half-rings or segments thus put under tension conforms to that adopted for whole rings. In Figs. 10 to 13 tensioning devices engage at the points where the half-ring $t$ is most deformed outward. According to Fig. 10 the deflection is obviated by means of the tensioning contrivance (illustrated in Fig. 4) or by thrust-bolts in the manner referred to above.

Figure 12:
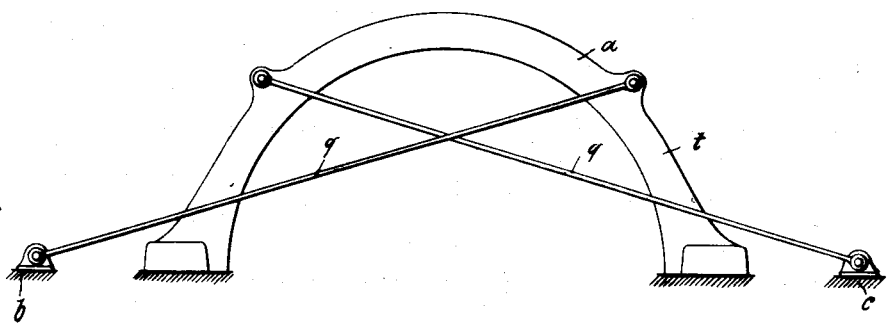
Figure 11:
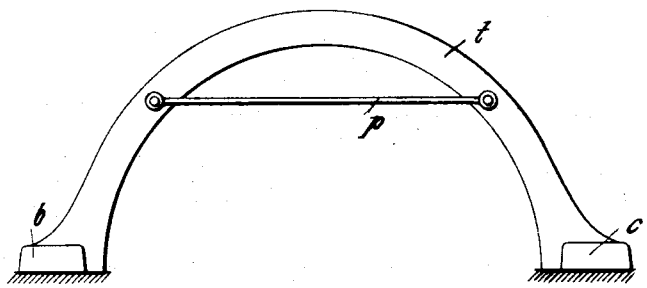
Figure 13:
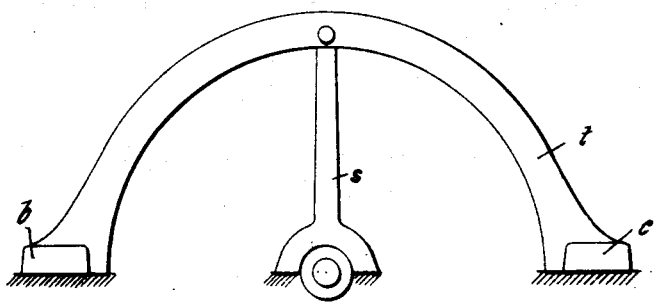
Figure 14:
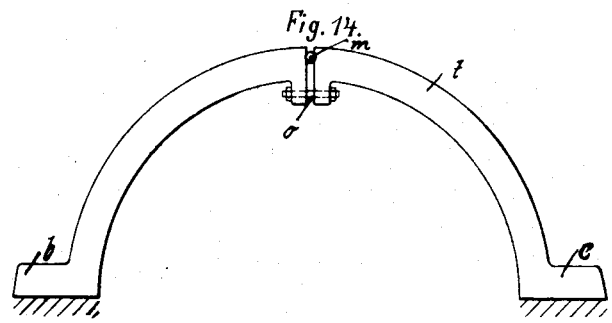

In Fig. 11 the points where the ring is most deformed outward are connected by tensioning-rods $p$, and according to the construction shown in Fig. 12 the tensioning-rods $q$ have their point of support outside the half-ring $t$ in the feet of the bed-plates or in the bed-piece itself. A form of the invention in which the deflection at the point where the ring is most bent inward is prevented by means of a pressure device—viz., an arm $s$, as shown in Fig. 13—while according to Fig. 14 the deflection in the arch is obviated by tightening the tension-screws $o$, which are arranged on the inside, or by pressing devices arranged outside.

Figure 15:
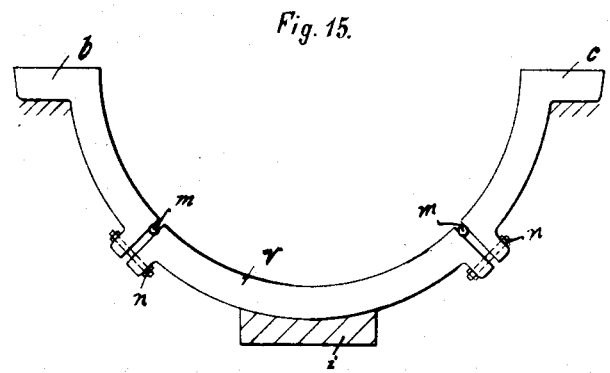
Figure 16:
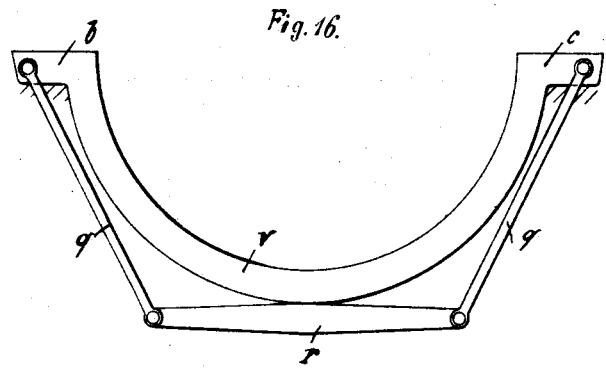

In Figs. 15 and 16 two examples of the invention as applied to suspended half-rings are shown. In Fig. 15 a suspended half-ring $v$, with three points of support $b\ c\ i$, is grasped at the points where it is most deeply deflected by tension-screws $n$, which are arranged in the manner previously described on the cheek-segments or on the metal rim itself. With a suspended half-ring $v$, having only two points of support $b\ c$, Fig. 16, any deformation at the deepest hanging-point is obviated by tension-rods $q$, bearing directly on this point, or by means of a supporting-plate $r$, Fig. 16.

It may once more be mentioned that the present invention is intended for entire rings, half-rings, and segments, and that not only can the deformation be obviated by bearing on all points where the greatest inward or outward deformation occurs, but that it is sufficient if the tension or pressing devices be caused to bear only on some points of the greatest inward or outward deformation. Moreover, the pressure and tensioning devices may also be caused to bear on points in the metal ring or segment which are only adjacent to the spots where the greatest inward and outward deformation occurs.

Having described my invention, what I claim, and desire to secure by Letters Patent, is—

Sheet-metal rings and segments for stationary armatures and inductor-rings of electrical machines, provided with one or more pressure-exerting devices at or near those points where deformation is greatest, for the purpose of obviating the inward and outward bending of the rings or segments.

OSKAR LASCHE.

Witnesses:
 HENRY HASPER,
 WOLDEMAR HAUPT.